(12) United States Patent
Satoh

(10) Patent No.: US 7,258,295 B2
(45) Date of Patent: Aug. 21, 2007

(54) CARTRIDGE CASE AND INFORMATION RECORDING MEDIUM

(75) Inventor: Takateru Satoh, Tokyo (JP)

(73) Assignee: TDK Corporation, Tokyo (JP)

( * ) Notice: Subject to any disclaimer, the term of this patent is extended or adjusted under 35 U.S.C. 154(b) by 410 days.

(21) Appl. No.: 11/042,174

(22) Filed: Jan. 26, 2005

(65) Prior Publication Data

US 2006/0163408 A1    Jul. 27, 2006

(51) Int. Cl.
*G11B 23/07* (2006.01)
(52) U.S. Cl. .................................. 242/348; 360/132
(58) Field of Classification Search .............. 242/342, 242/345, 347, 348, 348.2; 360/132
See application file for complete search history.

(56) References Cited

U.S. PATENT DOCUMENTS

| 6,651,917 | B2 | 11/2003 | Momoi et al. |
| 2002/0047063 | A1 | 4/2002 | Kaneda et al. |
| 2004/0195414 | A1 | 10/2004 | Kaneda et al. |

FOREIGN PATENT DOCUMENTS

JP    2002-100148    4/2002

OTHER PUBLICATIONS

English language Abstract of JP 2002-100148.

*Primary Examiner*—John Q. Nguyen
(74) *Attorney, Agent, or Firm*—Greenblum & Bernstein, P.L.C.

(57) ABSTRACT

A cartridge case includes: a tape reel including a hub that is shaped like a bottomed-cylinder and on an outer surface of a base plate of which ring-shaped driven teeth, in whose base part an inclined surface is formed, are disposed; a lower case that has an opening, a ring-shaped contact part and a guide surface, the opening being formed in a center of a base plate of the lower case, the contact part being formed in a protruding state on an inner surface of the base plate so as to surround the opening and having a contact surface that contacts and supports the tape reel at a position on the base plate of the hub outside the driven teeth, and the guide surface, which has a complementary form to the inclined surface of the driven teeth, being formed at an edge of the opening; and an upper case that together with the lower case encloses the tape reel in a rotatable state. The contact part is formed so that an end of the contact surface on a center of the opening-side is positioned closer to an outer circumference of the base plate of the lower case than a virtual plane that extends from the guide surface.

4 Claims, 6 Drawing Sheets

CARTRIDGE CASE AND INFORMATION RECORDING MEDIUM

BACKGROUND OF THE INVENTION

1. Field of the Invention

The present invention relates to a cartridge case including a tape reel and an upper case and a lower case that enclose the tape reel in a rotatable state, and to an information recording medium including the cartridge case.

2. Description of the Related Art

As one example of an information recording medium that can record a large amount of data, the present applicant has disclosed a single reel-type tape cartridge in Japanese Laid-Open Patent Publication No. 2002-100148. This tape cartridge is constructed of a main case and a single tape reel that is rotatably enclosed inside the main case and around which a magnetic tape is wound. The main case includes an upper case and a lower case that can engage one another. Here, an opening through which a drive shaft of an apparatus (drive apparatus) can pass is formed in the lower case. On the other hand, the tape reel is constructed of an upper flange and a hub in the shape of a bottomed cylinder at whose lower end a lower flange is integrally formed. In this case, ring-shaped engaging teeth (driven teeth), which are caused to engage driving teeth of the drive shaft when the tape reel is rotated, are disposed on a lower surface (outer surface) of the hub.

By investigating the above technology, the present inventor discovered the following problem to be solved. In this tape cartridge, as shown in FIG. 12, an inclined surface 102 is formed on a base part of engaging teeth 101 of a tape reel 100 and a guide surface 112 formed in a complementary shape to the inclined surface 102 is formed at an edge of an opening 111 of the lower case 110. In a state where the tape cartridge is not in use, the inclined surface 102 and the guide surface 112 are in contact so that the tape reel 100 and the lower case 110 are positioned with the center of the tape reel 100 and the center of the opening 111 of the lower case 110 in alignment. During use of the tape cartridge, as shown in FIG. 13, the engaging teeth 101 of the tape reel 100 and the driving teeth (not shown) of the drive shaft engage, the drive shaft presses the tape reel 100 upward and rotates the tape reel 100 in a state where the inclined surface 102 of the tape reel 100 is separated from the guide surface 112 of the lower case 110. The lower case 110 of the tape cartridge is manufactured by injection molding resin. Here, the injection-molded resin shrinks after molding due to its characteristics, and due to such shrinkage, as shown in FIG. 14, there are cases where an edge of the opening 111 of the lower case 110 becomes slightly warped inward (i.e., toward the tape reel 100). Accordingly, during use, sufficient clearance is not maintained in the tape cartridge between the engaging teeth 101 of the tape reel 100 and the edge of the opening 111 of the lower case 110, and as a result, when the tape reel 100 and the lower case 110 become relatively displaced due to vibration or tilting, there is the risk of contact between the engaging teeth 101 of the tape reel 100 and the edge of the opening 111.

SUMMARY OF THE INVENTION

The present invention was conceived in view of the problem to be solved described above, and it is a principal object of the present invention to provide a cartridge case and an information recording medium that can prevent contact between driven teeth of a tape reel and a lower case during use.

To achieve the stated object, a cartridge case according to the present invention includes: a tape reel including a hub that is shaped like a bottomed-cylinder and on an outer surface of a base plate of which ring-shaped driven teeth, in whose base part an inclined surface is formed, are disposed; a lower case that has an opening, a ring-shaped contact part and a guide surface, the opening being formed in a center of a base plate of the lower case, the contact part being formed in a protruding state on an inner surface of the base plate so as to surround the opening and having a contact surface that contacts and supports the tape reel at a position on the base plate of the hub outside the driven teeth, and the guide surface, which has a complementary form to the inclined surface of the driven teeth, being formed at an edge of the opening; and an upper case that together with the lower case encloses the tape reel in a rotatable state, wherein the contact part is formed so that an end of the contact surface on a center of the opening-side is positioned closer to an outer circumference of the base plate of the lower case than a virtual plane that extends from the guide surface.

Also, an information recording medium according to the present invention includes: a tape reel including a hub that is shaped like a bottomed-cylinder and on an outer surface of a base plate of which ring-shaped driven teeth, in whose base part an inclined surface is formed, are disposed; a lower case that has an opening, a ring-shaped contact part and a guide surface, the opening being formed in a center of a base plate of the lower case, the contact part being formed in a protruding state on an inner surface of the base plate so as to surround the opening and having a contact surface that contacts and supports the tape reel at a position on the base plate of the hub outside the driven teeth, and the guide surface, which has a complementary form to the inclined surface of the driven teeth, being formed at an edge of the opening; an upper case that together with the lower case encloses the tape reel in a rotatable state; and a magnetic tape wound around the tape reel, wherein the contact part is formed so that an end of the contact surface on a center of the opening-side is positioned closer to an outer circumference of the base plate of the lower case than a virtual plane that extends from the guide surface.

With the cartridge case and the information recording medium, the contact part is formed so that the end of the contact surface on the center of the opening-side is positioned closer to an outer circumference of the base plate of the lower case than a virtual plane that extends from the guide surface. This means that even if the edge of the opening on the base plate of the lower case is warped toward the tape reel, for example, sufficient clearance can still be maintained between the driven teeth and the base plate of the lower case. For this reason, according to this cartridge case and information recording medium, it is possible to reliably prevent contact between the driven teeth of the tape reel and the base plate of the lower case during use.

In this case, a step part may be formed in the edge of the opening, the step part being composed of a first surface, which is in continuous contact with the end of the contact surface at a right angle or a substantially right angle to the contact surface, and a second surface, which is parallel or substantially parallel to the contact surface and is in continuous contact with the first surface and a contact surface-side end of the guide surface. With this construction, compared to a construction where the step part is not formed, the thickness of the edge of the opening can be made thin, so that when the lower case is manufactured by injection molding, for example, the occurrence of warping of the edge of the opening due to shrinkage of the resin or the like can be reliably prevented.

Also, the step part may be formed so that a thickness between the second surface and an outer surface of the base plate of the lower case is equal or substantially equal to a thickness of a part of the base plate outside the contact part. With this construction, the strength of the edge of the opening can be kept sufficiently high.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a cartridge case and an information recording medium according to the present invention will now be described with reference to the attached drawings.

First, the construction of an information recording medium 1 will be described with reference to the drawings.

Figure 1:
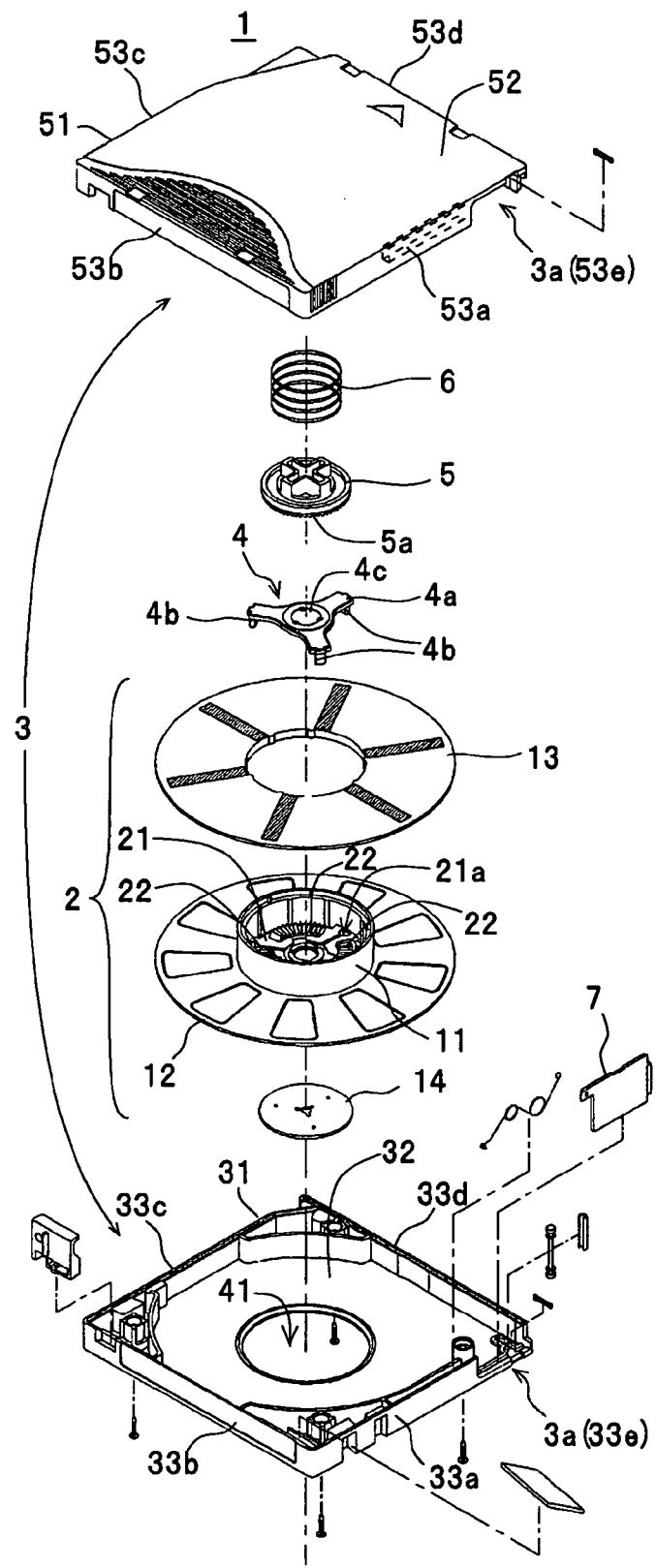
FIG. 1 is an exploded perspective view of an information recording medium.

The information recording medium 1 shown in FIG. 1 is a single-reel, cartridge-type information recording medium that is used as a storage device for backing up recording data that has been recorded by a computer, for example. As shown in FIG. 1, the information recording medium 1 includes a tape reel 2, a case main body 3, a brake releasing plate 4, a locking member 5, a brake spring 6, and a door member 7. It should be noted that in reality, a magnetic tape T (see FIG. 4) is wound around the tape reel 2 in the information recording medium 1, but such magnetic tape T has been omitted from FIG. 1 for ease of understanding the constructions of the respective parts. Here, the cartridge case according to the present invention is constructed of the respective components aside from the magnetic tape T.

Figure 2:
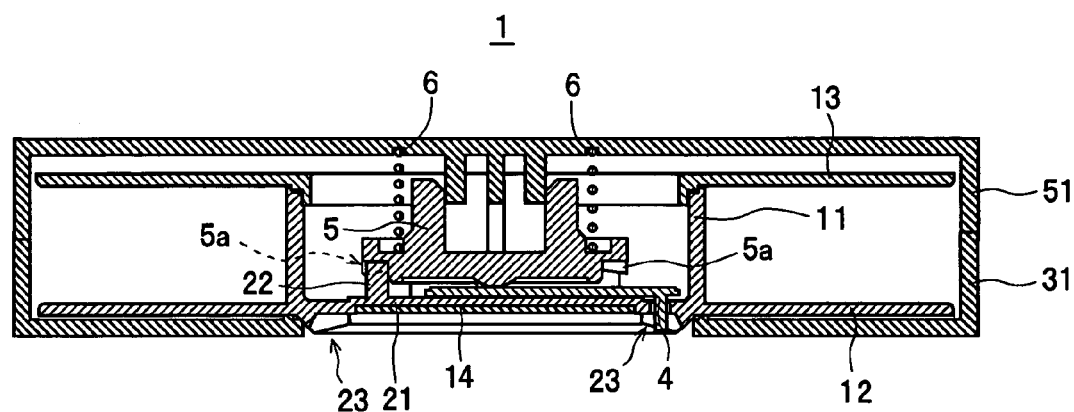
FIG. 2 is a cross-sectional view of the information recording medium.
Figure 3:
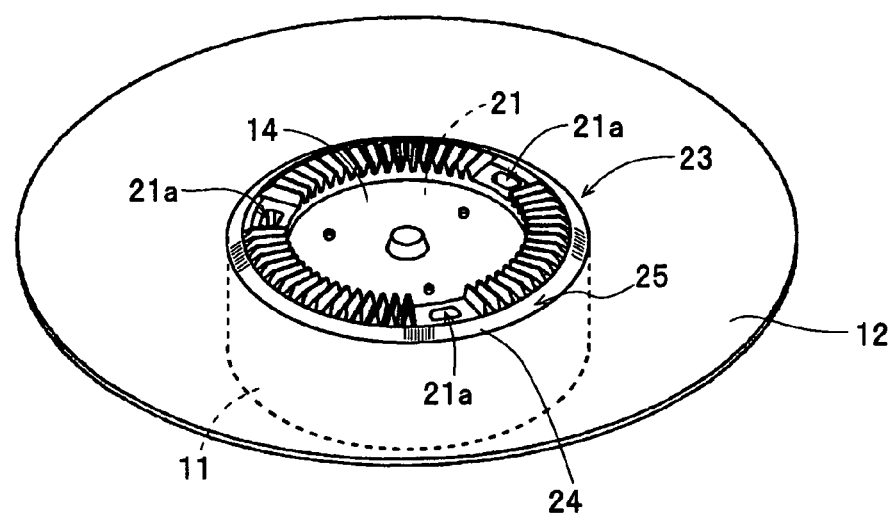
FIG. 3 is a perspective view of a hub and a lower flange when seen from a base plate side of the hub.
Figure 4:
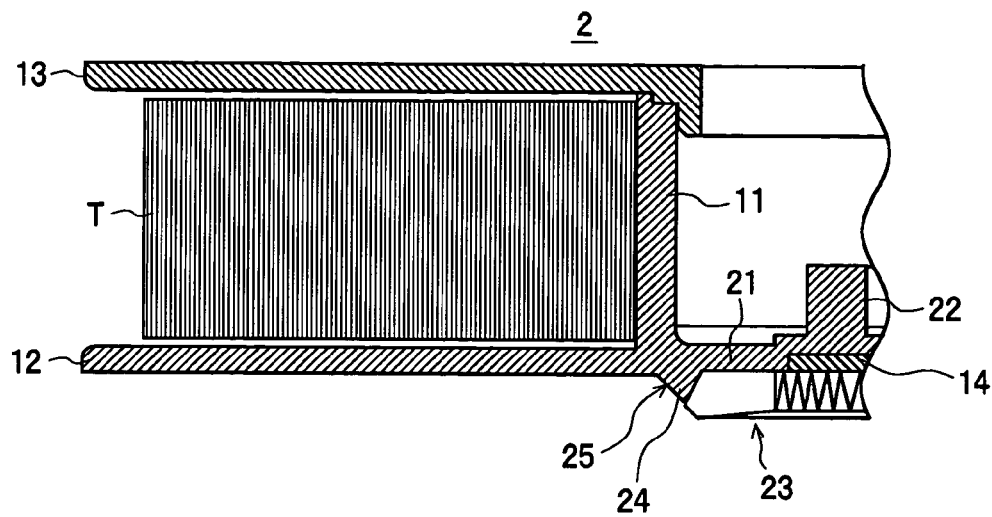
FIG. 4 is a cross-sectional view of a tape reel.

As shown in FIG. 1, the tape reel 2 includes a hub 11, a lower flange 12, and an upper flange 13. The hub 11 is shaped as a bottomed cylinder where an opening is formed at an upper end, and is constructed so that the magnetic tape T can be wound around a circumference thereof. Also, as shown in FIGS. 1 and 2, braking teeth 22 that are arc-shaped when viewed from above and engage teeth 5a of the locking member 5 energized by the brake spring 6 are formed on an inner surface of a base plate 21 of the hub 11 so as to be positioned on a circle that is concentric with the axis of the hub 11. Also, as shown in FIG. 3, insertion through-holes 21a for attaching the brake releasing plate 4 (see FIG. 1) so that the brake releasing plate 4 is capable of up-down movement are formed in the base plate 21 of the hub 11 so as to be positioned on a circle that is concentric with the axis of the hub 11. In addition, as shown in FIG. 3, a metal plate 14 (see FIG. 1) is attached to an outer surface of the base plate 21 of the hub 11 so that a drive shaft of a drive apparatus, not shown, and the hub 11 (tape reel 2) can be chucked by magnetic attraction. On the outer surface of the base plate 21, ring-shaped driven teeth 23 that engage driving teeth (not shown) on the drive shaft are formed so as to surround the metal plate 14. As shown in FIGS. 3 and 4, an inclined surface 25 is formed at a base end 24 of the driven teeth 23.

As shown in FIG. 3, the lower flange 12 is constructed in a disc shape and is integrally formed with the lower end (the end positioned at the top in FIG. 3) of the hub 11. As shown in FIG. 1, the upper flange 13 is constructed in a disc shape and is fixed to an opening side-end of the hub 11.

Figure 5:
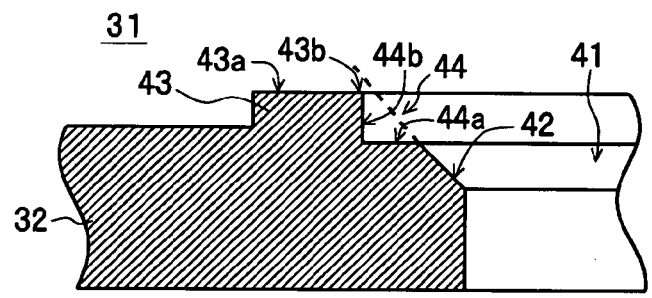
FIG. 5 is a cross-sectional view of a base plate of a lower case.
Figure 6:
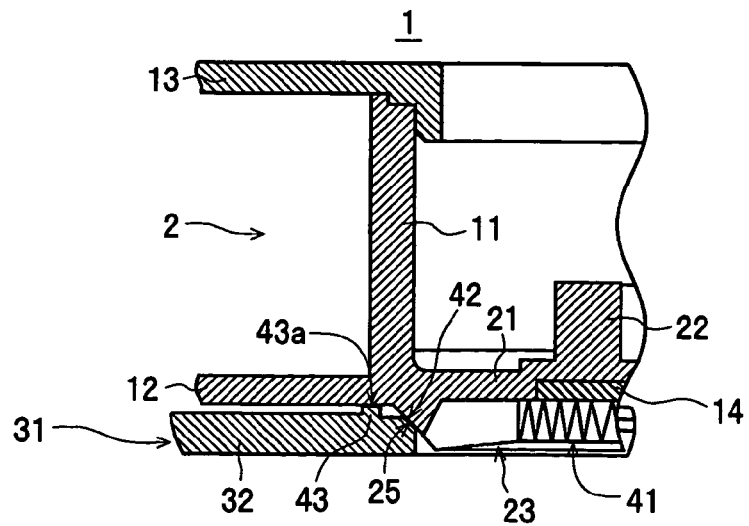
FIG. 6 is a cross-sectional view of the tape reel and the lower case in a state where the information recording medium is not in use.

As shown in FIG. 1, the case main body 3 is constructed of a lower case 31 and an upper case 51 that can engage one another, and encloses the tape reel 2 in an internal space formed when the upper and lower cases 31, 51 engage one another so that the tape reel 2 is rotatable. The lower case 31 includes a base plate 32 and side walls 33a to 33d (hereinafter referred to as "side walls 33" when no distinction is made) and is shaped as a shallow plate. In this case, a circular opening 41 that allows the drive shaft of a drive apparatus to pass through is formed in a center of the base plate 32. As shown in FIG. 5, a guide surface 42 with a complementary form to the inclined surface 25 of the driven teeth 23 of the hub 11 is formed at an edge of the opening 41 in the base plate 32. In this case, as shown in FIG. 6, the guide surface 42 contacts the inclined surface 25 in a state where the information recording medium 1 is not in use and therefore functions as a guide that positions the tape reel 2 and the lower case 31 so that the center of the tape reel 2 and the center of the opening 41 are aligned.

Also, as shown in FIG. 5, a ring-shaped contact part 43 is formed in a protruding state on an inner surface of the base plate 32 so as to surround the opening 41. Here, as shown in FIG. 5, the contact part 43 is formed so that an end 43b of a contact surface 43a on a side closest to the center of the opening 41 is located closer to an outer circumference (the left side in FIG. 5) of the base plate 32 than a virtual plane (a plane shown by a broken line in FIG. 5) that extends from the guide surface 42, that is, is located toward the side wall 33 side of the lower case 31. As shown in FIG. 6, in a state where the information recording medium 1 is not in use, the contact part 43 supports the tape reel 2 due to the contact surface 43a contacting a position (a boundary position between the base plate 21 and the lower flange 12) outside the driven teeth 23 in the base plate 21 of the hub 11. Also, as shown in FIG. 5, when a step part 44, which is composed of a side wall 44*b* (a first surface for the present invention) that continuously contacts the end 43*b* of the contact surface 43*a* at a right angle (or at substantially a right angle) to the contact surface 43*a* and an upper surface 44*a* (a second surface for the present invention) that continuously contacts the side wall 44*b* and a contact surface 43*a*—side end of the guide surface 42 in a state that is parallel to (or substantially parallel to) the contact surface 43*a*, is formed at the edge of the opening 41, the step part 44 being formed so that the thickness between the upper surface 44*a* and an outer surface of the base plate 32 is equal to (or substantially equal to) the thickness of a part of the base plate 32 located outside the contact part 43. Also, as shown in FIG. 1, a cutaway part 33*e*, which constructs a tape withdrawal opening 3*a* for withdrawing the magnetic tape T wound around the tape reel 2 to the outside, is formed in the side wall 33*a* of the lower case 31.

As shown in FIG. 1, the upper case 51 includes a top plate 52 and four side plates 53*a* to 53*d* and is formed in the shape of a shallow plate. In this case, four guide protrusions (not shown) that limit rotation of the locking member 5 and guide the locking member 5 in the up-down direction are formed in a center on an inner surface of the top plate 52. Also, a cutaway part 53*e*, which together with the cutaway part 33*e* of the lower case 31 constructs the tape withdrawal opening 3*a*, is formed in the side wall 53*a*.

As shown in FIG. 1, the brake releasing plate 4 is constructed of a main part 4*a*, three legs 4*b* that are erected on a rear surface (the lower surface in FIG. 1) of the main part 4*a* and are formed so as to be capable of passing through the insertion through-holes 21*a* of the hub 11, and a circular metal plate 4*c* that is attached to a center of a front surface (the upper surface in FIG. 1) of the main part 4*a*. Here, by inserting the legs 4*b* through the respective insertion through-holes 21*a* of the hub 11, the brake releasing plate 4 is attached on the base plate 21 side on the inside of the hub 11 so as to be capable of up-down movement but incapable of rotation relatively with respect to the hub 11.

As shown in FIG. 1, teeth 5*a* that can engage the braking teeth 22 of the hub 11 are formed on the base surface of the locking member 5. Here, the locking member 5 is energized by the brake spring 6 and stops rotation of the tape reel 2 due to the teeth 5*a* engaging the braking teeth 22 of the hub 11. The brake spring 6 is composed of a coil spring, is disposed between the upper case 51 and the locking member 5, and energizes the locking member 5 toward the base plate 21 of the hub 11 of the tape reel 2. Also, as shown in FIG. 1, the door member 7 is formed of a thin plate that can close the tape withdrawal opening 3*a* and is enclosed in guide channels respectively formed in the side wall 33*a* of the lower case 31 and the side wall 53*a* of the upper case 51 so as to be able to slide.

Next, the operation of the information recording medium 1 during recording and reproduction will be described with reference to the drawings.

In a state where the information recording medium 1 has been removed from a drive apparatus, not shown, or in other words, when the information recording medium 1 is not in use, as shown in FIG. 2, the locking member 5 is energized by the brake spring 6 and presses the brake releasing plate 4 while being moved toward the base plate 21 of the hub 11. In this state, the teeth 5*a* of the locking member 5 are caused to engage the braking teeth 22 of the hub 11 so that the tape reel 2 is locked in a non-rotatable state. In this state, as shown in FIG. 6, the contact surface 43*a* of the contact part 43 on the base plate 32 of the lower case 31 contacts a part of the base plate 21 of the hub 11 on an outside of the driven teeth 23 so that the tape reel 2 is supported by the contact part 43. Due to the contact between the guide surface 42 of the base plate 32 and the inclined surface 25 of the driven teeth 23 of the hub 11, the tape reel 2 and the lower case 31 are relatively positioned so that the center of the tape reel 2 and the center of the opening 41 are aligned. As a result, the tape reel 2 is prevented from rattling.

Figure 7:
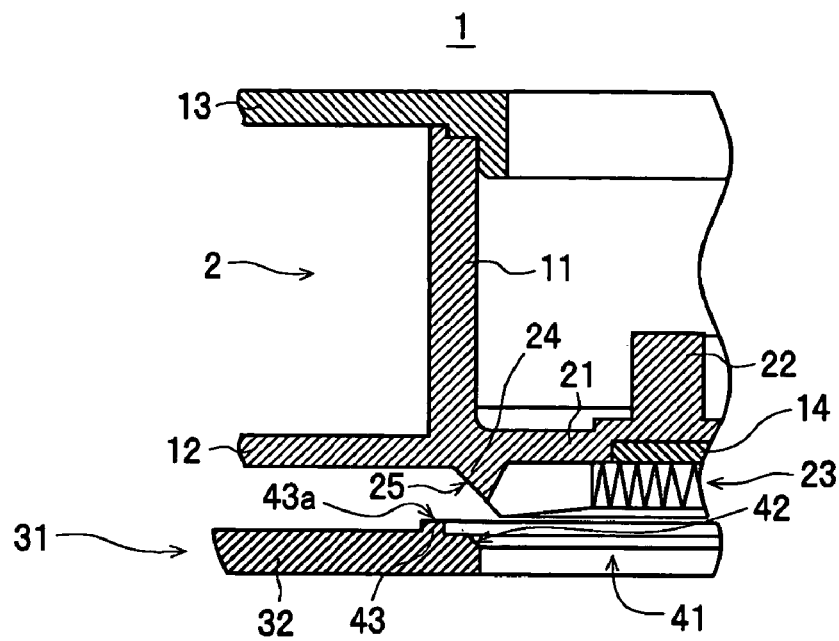
FIG. 7 is a cross-sectional view of the tape reel and the lower case in a state where the information recording medium is in use.

On the other hand, when the information recording medium 1 is loaded into a loading unit of the drive apparatus, the door member 7 is slid to open the tape withdrawal opening 3*a*. Next, the loading unit moves the information recording medium 1 toward an end of the drive shaft of the drive apparatus. At this time, the legs 4*b* of the brake releasing plate 4 are pressed by the drive shaft. As a result, the engagement of the teeth 5*a* of the locking member 5 and the braking teeth 22 of the hub 11 is released. In addition, the driving teeth disposed on the end of the drive shaft engage the driven teeth 23 of the hub 11 and the end of the drive shaft is attached to the metal plate 14 of the tape reel 2 by magnetic attraction, thereby chucking the drive shaft and the tape reel 2. Next, by further moving the information recording medium 1 toward the front end of the drive shaft, as shown in FIG. 7, the loading unit separates an outer surface of the base plate 21 of the hub 11 from the contact surface 43*a* of the contact part 43 of the lower case 31 and also separates the inclined surface 25 of the driven teeth 23 of the hub 11 from the guide surface 42 of the base plate 32 of the lower case 31. In this case, the amount by which the loading unit moves the information recording medium 1 is determined so as to achieve sufficient clearance between the driven teeth 23 and the base plate 32, for example.

Figure 8:
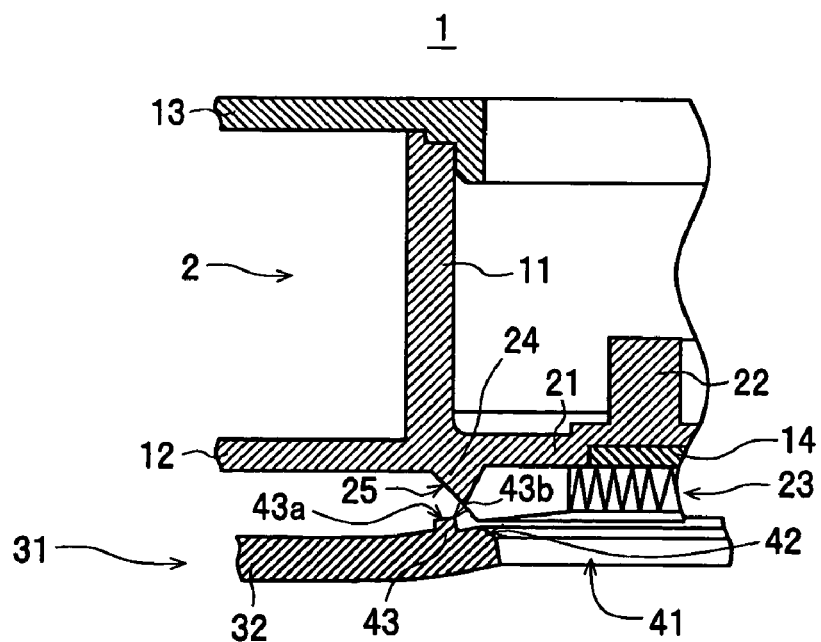
FIG. 8 is a cross-sectional view of the tape reel and the lower case in a state where an information recording medium whose base plate is warped is in use.

Next, the drive apparatus withdraws the magnetic tape T wound around the tape reel 2 from the tape withdrawal opening 3*a* to outside the case main body 3. Next, the magnetic tape T is wound around a tape reel of the drive apparatus and the drive shaft of the drive apparatus rotates at a rotational speed in accordance with the withdrawal speed of the magnetic tape T, thereby causing the tape reel 2 to rotate. Here, since sufficient clearance is achieved between the driven teeth 23 of the hub 11 and the base plate 32 of the lower case 31, even if the case main body 3 becomes eccentric with respect to the tape reel 2 (the drive shaft) during rotation of the tape reel 2, contact between the outer edges of the driven teeth 23 and the base plate 32 during rotation of the tape reel 2 is avoided. On the other hand, as shown in FIG. 8, in a state where an edge of the opening 41 of the base plate 32 is warped toward the tape reel 2, for example, the edge of the opening 41 becomes slightly closer to the driven teeth 23. In this case, the end 43*b* on the center of the opening 41—side of the contact surface 43*a* of the contact part 43 is formed closer to the outer circumference than the virtual plane that extends from the guide surface 42, that is, the end 43*b* is formed so as to be positioned towards the side walls 33 of the lower case 31, and therefore sufficient clearance will still be maintained between the driven teeth 23 and the base plate 32. Accordingly, even if the case main body 3 is eccentric with respect to the tape reel 2 during use of the information recording medium 1, contact between the outer edges of the driven teeth 23 and the base plate 32 is reliably avoided.

Next, when the rewinding of the magnetic tape T is complete, the loading part separates the information recording medium 1 from the end of the drive shaft. At this time, the locking member 5 energized by the brake spring 6 is moved toward the base plate 21 of the hub 11 and the teeth 5*a* of the locking member 5 are caused to engage the braking teeth 22 of the hub 11. The chucking of the drive shaft and the tape reel 2 is released and the tape reel 2 is pressed toward the lower case 31 by the energizing force of the brake spring 6. At this time, since the guide surface 42 of the base plate 32 of the lower case 31 and the inclined surface 25 of the driven teeth 23 of the hub 11 come into contact, the tape reel 2 and the lower case 31 are positioned relative to one another so that the center of the tape reel 2 and the center of the opening 41 are aligned. Next, the contact surface 43a of the contact part 43 of the lower case 31 contacts the base plate 21 of the hub 11 and the tape reel 2 is supported by the contact part 43. By doing so, in the same way as the state described above where the information recording medium 1 is not in use, the tape reel 2 is locked in a non-rotatable state, so that rattling of the tape reel 2 is prevented.

In this way, according to the information recording medium 1, the contact part 43 is formed so that the end 43b on the center of the opening 41—side of the contact surface 43a is positioned closer to the outer circumference of the base plate 32 (the side wall 33—side of the lower case 31) than a virtually extended plane of the guide surface 42, so that even if the edge of the opening 41 of the base plate 32 is warped toward the tape reel 2, for example, sufficient clearance can still be maintained between the driven teeth 23 and the base plate 32. This means that according to the information recording medium 1, contact between the driven teeth 23 of the tape reel 2 and the base plate 32 of the lower case 31 can be reliably prevented during use.

Also, by forming the step part 44 in the edge of the opening 41 of the base plate 32, compared to a construction where the step part 44 is not formed, the thickness of the edge of the opening 41 can be made thin, so that when the lower case 31 is manufactured by injection molding, for example, the occurrence of warping of the edge of the opening 41 due to shrinkage of the resin or the like can be reliably prevented.

Also, by forming the step part 44 so that the thickness between the upper surface 44a of the step part 44 and the outer surface of the base plate 32 is equal or substantially equal to a part of the base plate 32 outside the contact part 43, the strength of the edge of the opening 41 can be kept sufficiently high.

Figure 9:
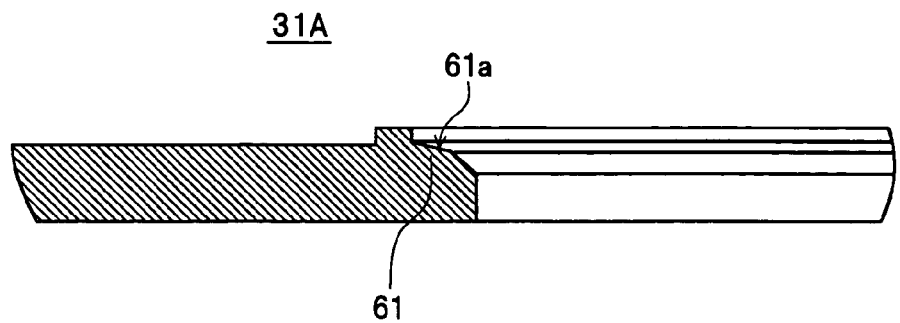
FIG. 9 is a cross-sectional view of another lower case.
Figure 10:
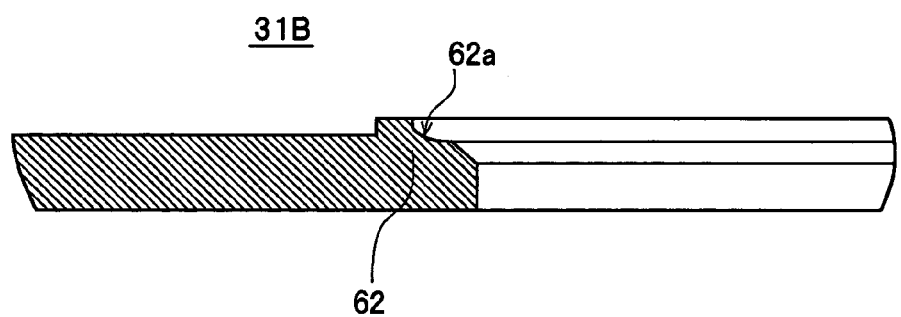
FIG. 10 is a cross-sectional view of another lower case.
Figure 11:
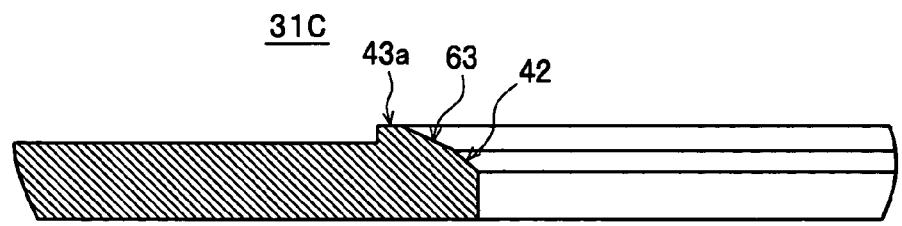
FIG. 11 is a cross-sectional view of another lower case.
Figure 12:
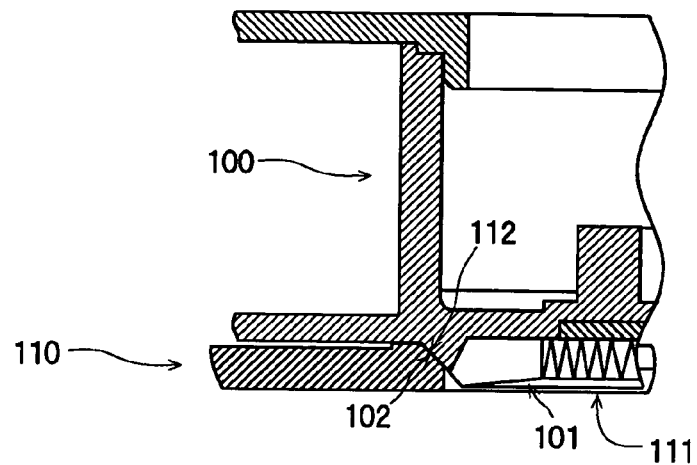
FIG. 12 is a cross-sectional view of a tape reel and a lower case in a state where an information recording medium disclosed by the present applicant is not in use.
Figure 13:
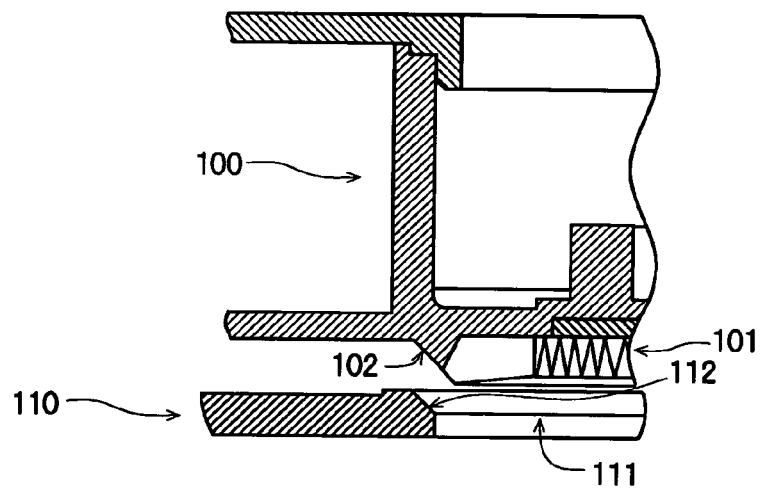
FIG. 13 is a cross-sectional view of the tape reel and the lower case in a state where the information recording medium shown in FIG. 12 is in use.
Figure 14:
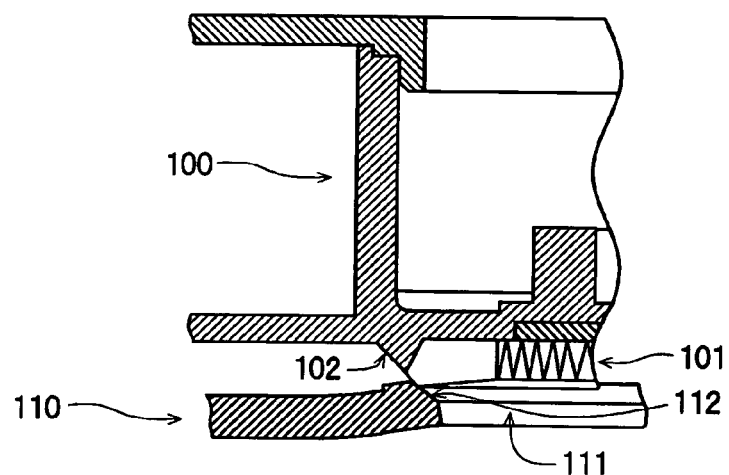
FIG. 14 is a cross-sectional view of the tape reel and the lower case in a state where an information recording medium shown in FIG. 12 with a warped base plate is in use.

It should be noted that the present invention is not limited to the above construction. For example, although an example where the upper surface 44a of the step part 44 is formed parallel (or substantially parallel) with the contact surface 43a of the contact part 43 has been described, like a lower case 31A shown in FIG. 9, it is also possible to use a construction where an upper surface 61a of a step part 61 is formed as an inclined surface or, like a lower case 31B shown in FIG. 10, a construction where an upper surface 62a of a step part 62 is formed as a curved surface. Also, like a lower case 31C shown in FIG. 11, it is possible to use a construction where the contact surface 43a and the guide surface 42 are connected by a flat surface 63 (or curved surface) with no step part being formed.

What is claimed is:

1. A cartridge case comprising:
   a tape reel including a hub that is shaped like a bottomed-cylinder and on an outer surface of a base plate and ring-shaped driven teeth, in whose base part an inclined surface is formed, are disposed;
   a lower case that has an opening, a ring-shaped contact part and a guide surface, the opening being formed in a center of a base plate of the lower case, the contact part being formed in a protruding state on an inner surface of the base plate so as to surround the opening and having a contact surface that contacts and supports the tape reel at a position on the base plate of the hub outside the driven teeth, and the guide surface, which has a complementary form to the inclined surface of the driven teeth, being formed at an edge of the opening; and
   an upper case that together with the lower case encloses the tape reel in a rotatable state,
   wherein the contact part is formed so that an end of the contact surface closest to the center of the opening is positioned closer to an outer circumference of the base plate of the lower case than a virtual plane that extends from the guide surface.

2. A cartridge case according to claim 1,
   wherein a step part is formed in the edge of the opening, the step part being composed of a first surface, which is in continuous contact with the end of the contact surface and is at a right angle or a substantially right angle to the contact surface, and a second surface, which is parallel or substantially parallel to the contact surface and is in continuous contact with the first surface and a contact surface-side end of the guide surface.

3. A cartridge case according to claim 2,
   wherein the step part is formed so that a thickness between the second surface and an outer surface of the base plate of the lower case is equal or substantially equal to a thickness of a part of the base plate outside the contact part.

4. An information recording medium comprising:
   a tape reel including a hub that is shaped like a bottomed-cylinder and on an outer surface of a base plate, and ring-shaped driven teeth, in whose base part an inclined surface is formed, are disposed;
   a lower case that has an opening, a ring-shaped contact part and a guide surface, the opening being formed in a center of a base plate of the lower case, the contact part being formed in a protruding state on an inner surface of the base plate so as to surround the opening and having a contact surface that contacts and supports the tape reel at a position on the base plate of the hub outside the driven teeth, and the guide surface, which has a complementary form to the inclined surface of the driven teeth, being formed at an edge of the opening;
   an upper case that together with the lower case encloses the tape reel in a rotatable state; and
   a magnetic tape wound around the tape reel,
   wherein the contact part is formed so that an end of the contact surface closest to the center of the opening is positioned closer to an outer circumference of the base plate of the lower case than a virtual plane that extends from the guide surface.

* * * * *

UNITED STATES PATENT AND TRADEMARK OFFICE
CERTIFICATE OF CORRECTION

PATENT NO. : 7,258,295 B2
APPLICATION NO. : 11/042174
DATED : August 21, 2007
INVENTOR(S) : Takateru Satoh Page 1 of 1

It is certified that error appears in the above-identified patent and that said Letters Patent is hereby corrected as shown below:

At column 7, line 59 (claim 1), delete "and" after "plate" and insert --,--.

At column 8, line 38 (claim 4), delete "and" after "plate".

Signed and Sealed this

First Day of July, 2008

JON W. DUDAS
*Director of the United States Patent and Trademark Office*